(No Model.)　　　　　　　　　　　J. C. LLOYD.　　　　　　　2 Sheets—Sheet 1.
PLANTER.
No. 515,151.　　　　　　　　　　　　　　　Patented Feb. 20, 1894.
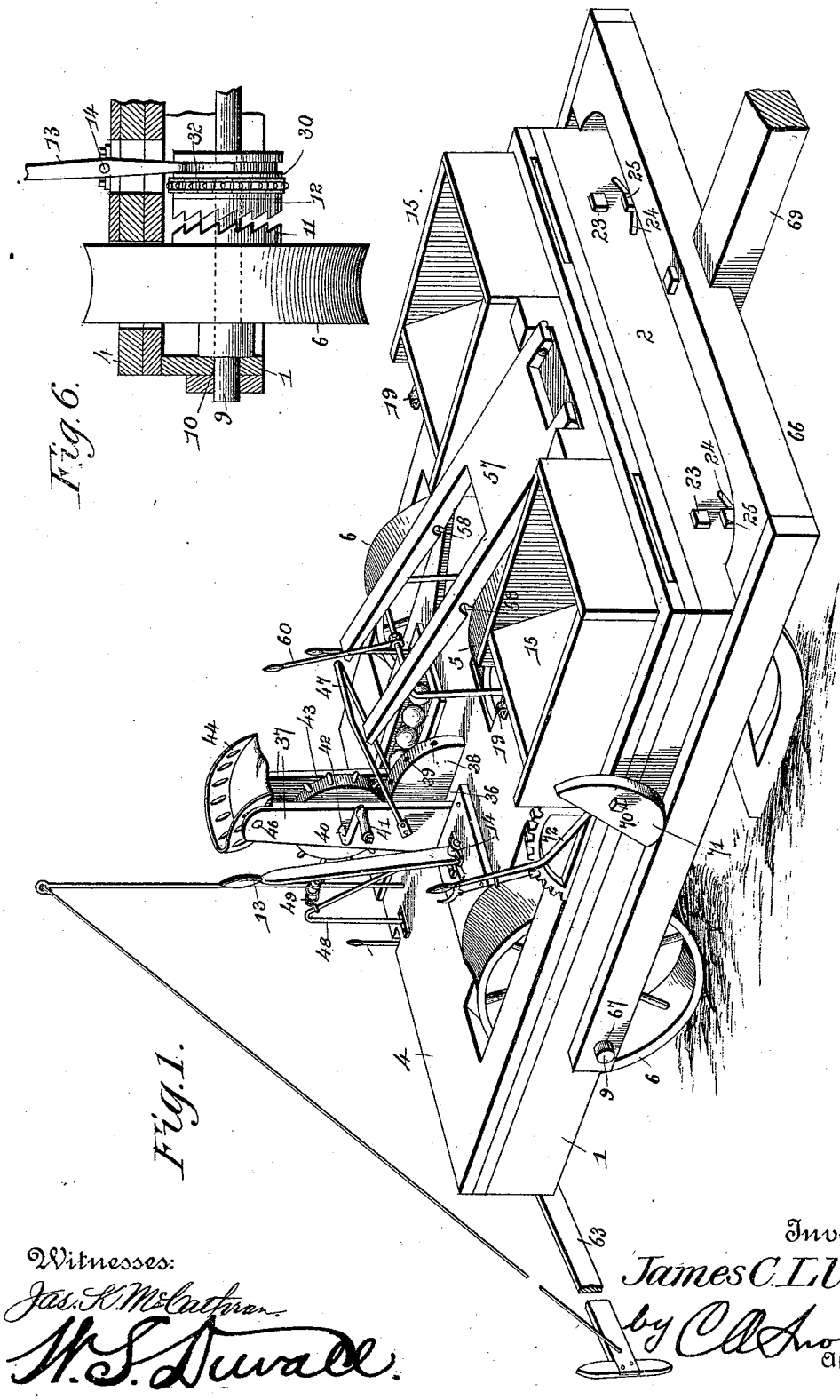
Witnesses:
Jas. K. McCathran
W. S. Duvall
Inventor:
James C. Lloyd
by C. A. Snow & Co
Attorneys.

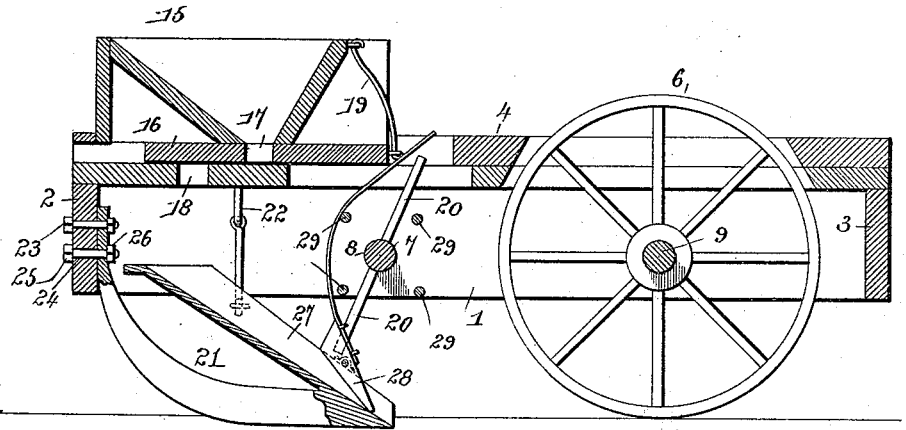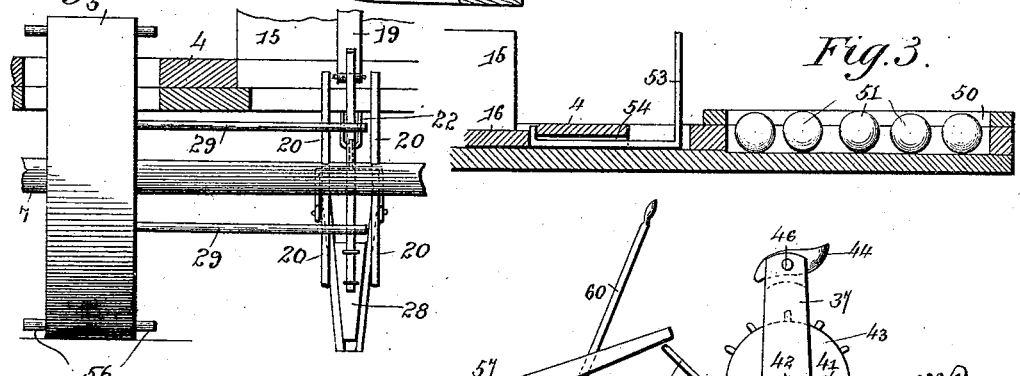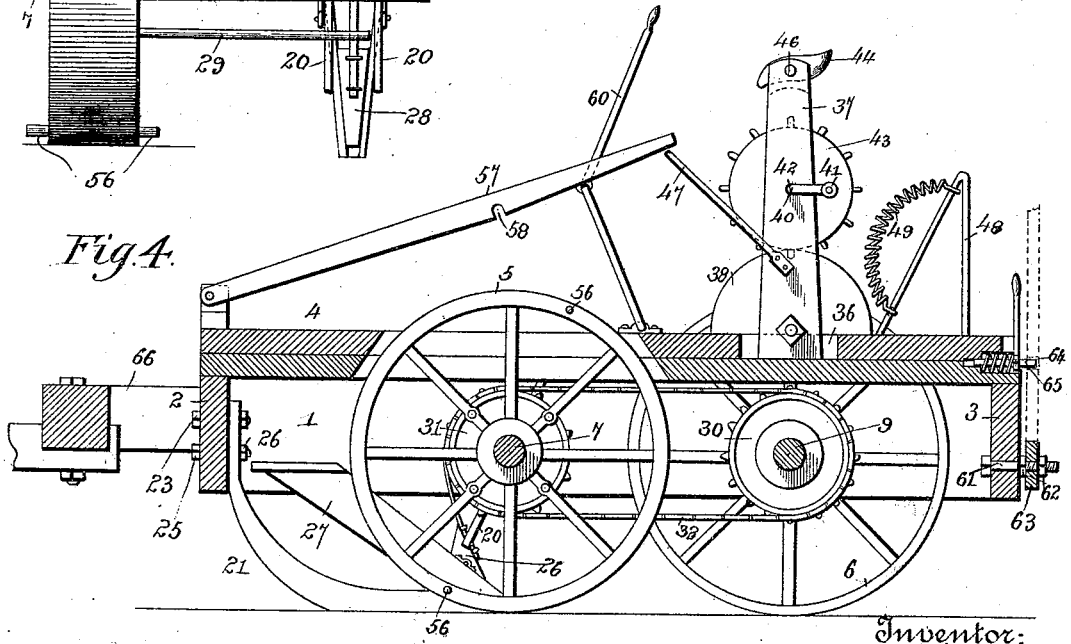

UNITED STATES PATENT OFFICE.

JAMES CHOLWELL LLOYD, OF AVONDALE, ILLINOIS.

PLANTER.

SPECIFICATION forming part of Letters Patent No. 515,151, dated February 20, 1894.

Application filed May 10, 1893. Serial No. 473,679. (No model.)

*To all whom it may concern:*

Be it known that I, JAMES CHOLWELL LLOYD, a citizen of the United States, residing at Avondale, in the county of Cook and State of Illinois, have invented a new and useful Planter, of which the following is a specification.

My invention relates to improvements in planters; and the objects in view are to provide a planter whose seed-mechanism will be operated by the ground-wheels of the machine, and which is adapted also to be operated by hand when impossible to operate through the medium of the ground-wheels, and to adapt the planter to be readily elevated at its front end, at the ends of the rows or while being transported to and from the field of operation.

Other objects and advantages of the invention will appear in the following description and the novel features thereof will be particularly pointed out in the claims.

Referring to the drawings:—Figure 1 is a perspective view of a planter embodying my invention. Fig. 2 is a longitudinal sectional view through one of the hoppers. Fig. 3 is a sectional view through the weight receptacle. Fig. 4 is a longitudinal sectional view through the center of the machine. Fig. 5 is a transverse sectional view in rear of one of the runners. Fig. 6 is a similar view illustrating the clutch.

Like numerals of reference indicate like parts in all the figures of the drawings.

The planter comprises a rectangular frame consisting of opposite side-bars 1 and front and rear cross-bars 2 and 3, respectively, and the whole is surmounted by a platform 4. The platform is provided with a front central opening and with opposite rear side openings, which openings receive the front ground-wheel 5 and the opposite ground-wheels 6. The ground-wheel 5 is mounted upon a transverse axle 7, located in bearings 8, formed in the side-bars 1 and the rear ground-wheels 6 are loosely mounted upon an axle 9 located in bearings 10 formed in the side-bars 1. One of the ground-wheels 6 is provided at its inner side or hub with one member of a clutch 11, and at the inner side of said wheel upon the axle a movable clutch member 12 is located, the latter being operated through the medium of a hand-lever 13, which projects up through the platform 4 and is fulcrumed in bearings 14. The wheels 6, as will hereinafter appear, follow the planting mechanism, and for that reason their peripheries are preferably concaved as shown.

In openings in the front corners of the platform opposite hoppers 15 are seated, and said hoppers are bottomless, and are provided upon their lower sides with slots in which are mounted seed-slides 16, each of which is provided with a seed-opening 17. Any suitable spring 19 is secured to each of the hoppers 15 and to the rear ends of the slides and serve to normally draw the same rearward so that their holes 17 are out of alignment with corresponding slots 18 with which the platform is provided below the hoppers. The slides are actuated against the tension of their springs 19 by means of tappet-bars 20, which are extended transversely through the axle 7 and at their opposite ends successively come in contact with and actuate the slides. The runners 21 are at their rear ends suspended upon staples 22, while at their front ends they are pivoted by bolts 23 to the front cross-bar of the framework. Below the bolts 23 concentric slots 24 are formed in the said cross-bar, and these receive bolts 25 which also connect with the runners and like the bolts 23 are provided with binding-nuts 26. It will thus be seen that the runners may be swung in or out and thus their distance apart increased or diminished. Seed-spouts 27 are carried by the runners and are flared or widened at their upper ends so that they readily receive the corn as dropped regardless of the positions of the runners; and each spout has mounted therein a pivoted flirt-valve 28, said flirt-valve being operated by means of tappets 29 which are arranged annularly in a series and project from the front ground-wheel 5. The rear axle is provided with a sprocket-wheel 30 and a corresponding wheel 31 is mounted upon the front axle 7 the two being connected through the medium of an ordinary sprocket-belt 32, whereby rotary motion may be transmitted from the rear axle to the front axle when the ground-wheel 5 is elevated out of contact with the ground, which occurs when the said front wheel 5 meets with any obstruction such as would throw it up. Upon such occasion the driver operates the lever 13 so as to throw the clutch-mechanism into engagement and thus transmit motion from the rear to the front axle which ordinarily is secured solely by the ground-wheel 5. An opening 36 is formed in the center of the platform 4 immediately in rear of the ground-wheel 5 and in the same is located a pair of standards 37, said standards being pivoted at their lower ends to the opposite sides of an intermediate segmental standard 38 whose periphery has cavities 39 arranged at irregular intervals. A crank-shaft 40, having pedals 41, is journaled as at 42 above the segmental locking-standard, and a spur-wheel 43 is rigidly mounted thereon. A seat 44 for the accommodation of the driver is located between the upper ends of the said standards, and pivoted in position as at 46, whereby it is capable of oscillating. A foot-rest 47 projects from the standards forward for the accommodation of the feet of the driver when his feet are not operating the pedals. It will be seen that a driver mounted upon the seat 44 may through the medium of the pedals rotate the spur-wheel, and the teeth of said wheel engaging with the cavities in the segmental standard will serve to oscillate the seat-carrying standard back and forth so that the weight of the driver will be disposed either back or in front of the rear shaft with which the standards transversely align. A standard 48 is located in rear of the segmental locking standard 38, and a coiled spring 49 is bowed and has its ends secured to the standard, its bowed portion being presented to the rear side of the spur-wheel 43 and serving to form a cushion against which the said wheel may strike when the seat-carrying standards and the wheel are moved to the rear. A cavity 50 is formed in the platform 4 and extends from a point above the rear axle to the rear end of the frame, and in said cavity there is located a series of movable or shifting weights 51. These weights are nearly sufficient to counterbalance the weight of the front mechanism and in addition to the weight of the rear end of the machine are quite sufficient to accomplish this, so that the additional weight of the driver at either side of the rear axle will either raise or depress the front end of the machine, thus bringing the ground-wheel 5 into operative position or contact with the ground or elevating the same out of operative position as the case may be. If desired an angular rod 53 may be located in a slot 54 in the platform and bear against the rear end of the seed-slide through the medium of which said seed-slide may be operated by hand if occasion should require. Transverse marking-pins 56 are located at diametrically opposite sides of the wheel 5 and extend from the opposite faces thereof near its periphery, and a bifurcated lever 57 is pivoted at its front end to the cross-bars of the framework, and its bifurcations embrace those pins in the wheel, and are provided upon their under side with notches 58. This lever may be depressed so that its notches will engage with the marking-pegs or pins through the medium of a hand lever 60 which is fulcrumed upon the platform. In this manner the wheel 5 may be locked, and thus the machine adapted to begin planting in an even manner, inasmuch as the said marking-pins simultaneously mark the hill with the dropping of the seed. A stud 61 extends from the center of the rear end bar of the frame and may be secured in any position by means of nuts 62, and adapted to be secured upon this stud is the inner end of a marker-bar 63 carrying at its outer end a marker. The marker-bar is provided with a hole 64, and a spring-actuated bolt 65 is located above the stud and adapted to engage with the hole and thus lock the bar in an elevated position.

66 designates a draft bail of rectangular shape, which embraces the opposite sides of the planter and has its opposite sides provided with perforations 67 for loosely engaging with the ends of the rear axle. From the center of the bail extends a draft-pole 69 to which the team is hitched. To one of the side-bars 1 above the terminals of the draft-bail there is eccentrically pivoted as at 70 a cam 71, the same having a handle 72 by which it may be operated. Through the medium of this cam the front end of the planter may be raised so that its front ground-wheel 5 will be out of operative contact with the ground and hence the planter inoperative.

The operation of the planter is similar to that of this class of planters wherein the corn is deposited in the drills without the use of the usual check-row mechanism, and it is thought it is sufficiently explained in connection with the foregoing description of the construction. I will, however, briefly mention the operation, which is as follows:—By adjusting the cam it will be seen that the front end of the planter together with the planting mechanism is elevated from the ground or depressed, the former operation taking place when the machine is being transported to the field of operation, and the latter operation taking place when the machine is being operated. It will be seen that as the front wheel revolves the tappets serve to operate the seed-slides in the manner heretofore described, and the operation is continued until the end of the row is reached, when it is desirable to stop the planting mechanism and turn the machine as easily as possible. This I accomplish by shifting the weight of the driver in the manner heretofore described, so that the front end of the machine is elevated, by which I not only cease the operation of the planting-mechanism but I also greatly relieve the necks of the horses by removing the strain therefrom. When the machine has been turned the bifurcated lever is dropped so as to engage with the most adjacent marking-stud or pin and the machine slid until it reaches the point for operation when the lever is re-elevated. If at any time the front wheel meets with an obstruction so as not to operate, the driver who is alert for this, operates the lever 13 so as to throw the clutch mechanism in gear and the operation proceeds. The driver is assisted in shifting his position and thus throwing the weight either in front or to the rear of the axle through the medium of the counterbalancing balls or weights located in the casing 50.

Various changes in the details of construction of my invention will readily suggest themselves to those skilled in this class of machines, and I therefore do not limit the same to such details as I have herein shown, but hold that I may vary the same to any degree and extent within the knowledge of the skilled mechanic.

Having described my invention, what I claim is—

1. In a planter, the combination with the rectangular frame carrying the planting-mechanism, of the rectangular draft-bail carrying the draft-tongue, and the cam pivoted to the side of the frame and bearing on the bail and provided with an operating lever, substantially as specified.

2. In a planter, the combination with the frame, the axle and the ground-wheels, of the planting-mechanism carried by the front of the frame, the seat-supporting standards, the crank-shaft journaled in the latter above the curved standard, and the spur-wheel carried by the shaft and adapted to engage the curved standard, substantially as specified.

3. In a planter, the combination with the frame, the axle, ground wheels, and the planting-mechanism supported at the front of the frame, of the pivoted seat-supporting standards arranged in line with the axle, the casing located in the frame in rear of the axle, and the shifting weights arranged in the casing, substantially as specified.

4. In a planter, the combination with the frame, the ground wheels and axle, of a hopper arranged on the frame, a reciprocating seed-slide arranged in the hopper, means for operating the slide, a front axle, a ground-wheel carried thereby, indicating pins extending therefrom near the periphery thereof, and a bifurcated lever pivoted on the frame and provided with notches for engaging with the pins, substantially as specified.

5. In a planter, the combination with the frame, the ground-wheels and axle, of a hopper arranged on the frame, a reciprocating seed-slide arranged in the hopper, means for operating the slide, a front axle, a ground-wheel carried thereby, indicating pins extending therefrom near the periphery thereof, a bifurcated lever pivoted on the frame and provided with notches for engaging with the pins, and a hand lever for operating the bifurcated lever, substantially as specified.

6. In a planter, the combination with the frame, the axle, ground-wheels, and the planting-mechanism carried by the front of the frame, of the pivoted seat-supporting standards arranged in line with the axle, means for oscillating the standards, and the spring-buffer located in rear and in the path thereof, substantially as specified.

7. In a planter, the combination with the frame, the front axle, the ground-wheel carried thereby, and the tappets extending from the wheel, of the opposite hoppers, means for operating the slides, the runners having the seed-discharges, and the flirt-valves arranged in the discharges in the path of the tappets, substantially as specified.

In testimony that I claim the foregoing as my own I have hereto affixed my signature in the presence of two witnesses.

JAMES CHOLWELL LLOYD.

Witnesses:
 JAS. R. DUNCAN,
 W. J. LLOYD.